United States Patent
Pavlek et al.

(10) Patent No.: US 10,563,039 B2
(45) Date of Patent: Feb. 18, 2020

(54) COMPOSITIONS AND METHODS FOR CROSSLINKING POLYMERS IN THE PRESENCE OF ATMOSPHERIC OXYGEN

(71) Applicant: Arkema Inc., King of Prussia, PA (US)

(72) Inventors: William P. Pavlek, Stevens, PA (US); Peter R. Dluzneski, Harleysville, PA (US); Leonard H. Palys, Downingtown, PA (US); Marina Despotopoulou, Havertown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/531,755

(22) PCT Filed: Dec. 3, 2015

(86) PCT No.: PCT/US2015/063612
§ 371 (c)(1),
(2) Date: May 31, 2017

(87) PCT Pub. No.: WO2016/094161
PCT Pub. Date: Jun. 16, 2016

(65) Prior Publication Data
US 2017/0267832 A1    Sep. 21, 2017

Related U.S. Application Data

(60) Provisional application No. 62/089,391, filed on Dec. 9, 2014.

(51) Int. Cl.
| | |
|---|---|
| C08K 5/00 | (2006.01) |
| B29C 48/00 | (2019.01) |
| C08J 3/24 | (2006.01) |
| B29C 35/04 | (2006.01) |
| C08L 23/16 | (2006.01) |
| B29C 35/08 | (2006.01) |
| C08K 5/08 | (2006.01) |
| C08K 5/103 | (2006.01) |
| C08K 5/14 | (2006.01) |
| C08K 5/3435 | (2006.01) |
| B29K 21/00 | (2006.01) |

(52) U.S. Cl.
CPC .......... C08K 5/0025 (2013.01); B29C 35/045 (2013.01); B29C 35/049 (2013.01); B29C 35/0805 (2013.01); B29C 48/022 (2019.02); C08J 3/247 (2013.01); C08K 5/08 (2013.01); C08K 5/103 (2013.01); C08K 5/14 (2013.01); C08K 5/3435 (2013.01); C08L 23/16 (2013.01); B29C 2035/0855 (2013.01); B29K 2021/00 (2013.01); C08J 2323/08 (2013.01); C08J 2323/16 (2013.01); C08J 2331/04 (2013.01); C08J 2333/08 (2013.01); C08J 2423/08 (2013.01); C08L 2312/00 (2013.01)

(58) Field of Classification Search
CPC ........ C08K 5/0025; C08K 5/14; C08K 5/103; C08K 5/08; C08K 5/3435; C08K 5/005; C08K 5/0016; B29C 35/045; B29C 35/049; B29C 35/0805; B29C 47/0004; B29C 2035/0855; C08J 3/247; C08L 23/16; B29K 2021/00
USPC ....................................................... 524/313
See application file for complete search history.

(56) References Cited

U.S. PATENT DOCUMENTS

| | | | |
|---|---|---|---|
| 2,374,316 A * | 4/1945 | Whiting ................ | C08F 283/00 524/313 |
| 3,855,194 A | 12/1974 | Conard | |
| 5,001,185 A | 3/1991 | Teratani et al. | |
| 6,620,871 B2 | 9/2003 | Wilson, III | |
| 6,747,099 B1 * | 6/2004 | Novits ................ | C08K 5/0025 525/330.4 |
| 6,767,940 B2 * | 7/2004 | Voorheis ............ | A63B 37/0003 473/354 |
| 7,211,611 B2 | 5/2007 | Wilson, III | |
| 7,829,634 B2 * | 11/2010 | Debaud .................... | C08F 8/30 525/204 |
| 7,842,759 B2 | 11/2010 | Esseghir et al. | |
| 9,644,089 B2 * | 5/2017 | Ranbom .................. | C08J 3/246 |
| 2002/0045057 A1 * | 4/2002 | Guritza ................ | A61L 2/0082 428/540 |
| 2003/0096904 A1 | 5/2003 | Hakuta et al. | |
| 2003/0139536 A1 | 7/2003 | Bertin et al. | |
| 2004/0087721 A1 * | 5/2004 | Bruhn ................ | C08L 23/0869 525/132 |
| 2004/0198920 A1 | 10/2004 | Debaud et al. | |
| 2005/0131127 A1 * | 6/2005 | Wilson, III ............ | A43B 13/04 524/492 |
| 2006/0116460 A1 | 6/2006 | Georget et al. | |
| 2007/0142528 A1 | 6/2007 | Oshima et al. | |
| 2007/0142565 A1 | 6/2007 | Chaudhary et al. | |

(Continued)

FOREIGN PATENT DOCUMENTS

| | | | | |
|---|---|---|---|---|
| EP | 1 700 886 A1 | 9/2006 | | |
| GB | 693819 A * | 7/1953 | ........... | H01F 27/022 |

(Continued)

*Primary Examiner* — Hui H Chin

(74) *Attorney, Agent, or Firm* — Lynn B. Morreale

(57) ABSTRACT

An organic peroxide formulation comprises at least one organic peroxide, at least one drying oil, and at least one free radical trap. A process comprises curing mixtures that include at least one elastomer and the organic peroxide formulation in the presence of oxygen. Elastomer compositions, methods of manufacturing elastomer articles, and elastomer articles made from the elastomer compositions are also disclosed.

12 Claims, No Drawings

(56) References Cited

U.S. PATENT DOCUMENTS

| | | |
|---|---|---|
| 2007/0145625 A1 | 6/2007 | Caronia et al. |
| 2007/0149712 A1 | 6/2007 | Chaudhary et al. |
| 2007/0149711 A1 | 7/2007 | Chaudhary et al. |
| 2007/0173613 A1 | 7/2007 | Chaudhary et al. |
| 2011/0250373 A1* | 10/2011 | Kozel ............... C08F 299/0442 428/36.9 |

FOREIGN PATENT DOCUMENTS

| | | | | |
|---|---|---|---|---|
| GB | 1015868 A | * | 1/1966 | ............ C08F 291/00 |
| JP | 2008 188952 A2 | | 8/2008 | |
| JP | 2008 247976 A2 | | 10/2008 | |

\* cited by examiner

COMPOSITIONS AND METHODS FOR CROSSLINKING POLYMERS IN THE PRESENCE OF ATMOSPHERIC OXYGEN

CROSS-REFERENCE TO RELATED APPLICATIONS

This application is a national stage application under 35 U.S.C. § 371 of PCT/US2015/063612 filed Dec. 3, 2015, which claims benefit to U.S. patent application Ser. No. 62/089,391, filed, Dec. 9, 2014.

FIELD OF THE INVENTION

The present invention relates to compositions and methods for crosslinking polymers in the presence of atmospheric oxygen and to products made by those methods.

BACKGROUND OF THE INVENTION

Polymers and copolymers crosslinked by free radical processes, including through use of organic peroxides and/or azo initiators are known to have superior properties, particularly compared to polymers crosslinked by sulfur cure. These properties include high heat aging resistance, low compression set, decreased staining of metal or coated metal sheet, and easy production of colored products with enhanced color stability. In view of these beneficial properties, peroxide cure has a great deal of practical importance. A possible drawback of peroxide cure is that air must typically be excluded from the surface of a material during cure; if the air is not excluded, a tacky surface may result, due to cure inhibition by oxygen.

In many cases, manufacturers would like to switch from sulfur to peroxide cure and use existing hot air ovens; however, curing with conventional peroxide systems under these circumstances would not be viable, as a tacky surface would result. In order to avoid tacky surfaces on objects fabricated using such free radical crosslinking by organic peroxides and/or azo initiators, it has been conventional to exclude air from contact with the surface during cure. Measures to exclude oxygen add to the cost and complexity of the cure step and it is often difficult to assure the complete exhaustion of air and oxygen; for example, in steam autoclaves and in the interior of hoses. Another issue occurs when peroxides are chosen for an elastomer cure, but incomplete evacuation of the mold is achieved (e.g., during compression molding, injection molding or transfer molding). Even trace amounts of oxygen may cause significant mold fouling that necessitates frequent mold cleaning and adds cost to the operation.

In order to reduce the cost and complexity of the cure step, various methods have been suggested for preventing surface cure inhibition by oxygen during free radical crosslinking. These methods have, for various reasons, met with little or no success. In particular, none have provided a tack-free surface while providing the desirable physical properties of peroxide cure, such as superior compression. Moreover, various methods involving sulfur cure and peroxide cure are limited to unsaturated elastomers.

Further information is described in U.S. Pat. Nos. 5,001, 185; 6,620,871; 6,747,099; 7,211,611 and U.S. pub. No. U.S. 2003/0096904 corresponding to PCT/JP01/06375.

Thus, it is desirable to have organic peroxide formulations and methods which cure commercially available crosslinkable elastomers and polymers, both saturated and unsaturated, in the full or partial presence of atmospheric oxygen.

It is also desirable to have moldable elastomeric compositions that do not stick to the mold.

SUMMARY OF THE INVENTION

Embodiments of the present invention relate to organic peroxide formulations that can cure elastomers in the full or partial presence of oxygen (e.g., using a hot air oven or tunnel, or a steam autoclave). Embodiments of the invention also relate to compositions containing the crosslinkable elastomers, processes for curing the elastomers, and products made by such processes.

The applicants have discovered that, by including one or more drying oils in an organic peroxide formulation, significant reductions in surface tackiness can be obtained when curing elastomers in the full or partial presence of oxygen (e.g., using a hot air oven or tunnel, or a steam autoclave). Therefore, organic peroxide compositions comprising one or more drying oils can replace sulfur vulcanization in cure processes where oxygen (e.g., atmospheric oxygen) may be present in various amounts.

Embodiments of the present invention relate to an organic peroxide formulation comprising, consisting essentially of, or consisting of:
  A) at least one organic peroxide; and
  B) at least one drying oil,
wherein the amounts of the at least one organic peroxide and the at least one drying oil are selected such that the formulation is capable of curing an elastomer composition in the full or partial presence of oxygen (e.g., using a hot air oven or tunnel, or a steam autoclave). According to particular embodiments, the formulation further comprises at least one free radical trap.

Embodiments of the present invention also relate to an elastomer composition comprising, consisting essentially of, or consisting of:
  A) at least one elastomer,
  B) at least one organic peroxide, and
  C) at least one drying oil,
wherein the elastomer composition is curable in the full or partial presence of oxygen (e.g., using a hot air oven or tunnel, or a steam autoclave). According to particular embodiments, the formulation further comprises at least one free radical trap.

Embodiments of the present invention also relate to an elastomer composition comprising, consisting essentially of, or consisting of:
  A) at least one elastomer,
  B) at least one organic peroxide,
  C) at least one drying oil, and
  D) at least one quinone or hydroquinone (e.g., MTBHQ),
wherein the elastomer composition is curable in the full or partial presence of oxygen (e.g., using a hot air oven or tunnel, or a steam autoclave). According to particular embodiments, the formulation further comprises at least one free radical trap.

Embodiments of the present invention also relate to an elastomer composition comprising, consisting essentially of, or consisting of:
  A) at least one elastomer,
  B) at least one organic peroxide,
  C) at least one drying oil, and
  D) at least one nitroxide (e.g., 4-hydroxy-TEMPO),
wherein the elastomer composition is curable in the full or partial presence of oxygen (e.g., using a hot air oven or tunnel, or a steam autoclave). According to particular embodiments, the formulation further comprises at least one free radical trap.

Embodiments of the present invention also relate to a process for curing an elastomer composition, the process comprising curing the elastomer composition in the presence of oxygen, wherein the composition comprises at least one elastomer, at least one organic peroxide, and at least one drying oil. According to particular embodiments, the formulation further comprises at least one free radical trap.

Embodiments of the present invention also relate to a method for manufacturing an article comprising an elastomer composition as described herein, the method comprising curing the elastomer composition in the full or partial presence of oxygen (e.g., using a hot air oven or tunnel, or a steam autoclave). The method may comprise the steps of extruding the elastomer composition in the presence of hot air to form an uncured preform article; and curing the uncured preform article.

Embodiments of the present invention also relate to products made by the above methods.

DETAILED DESCRIPTION

One aspect of the present invention relates to an organic peroxide formulation comprising, consisting essentially of, or consisting of, at least one organic peroxide and at least one drying oil. The applicants have discovered that, by including one or more drying oils in an organic peroxide formulation, significant reductions in surface tackiness can be obtained when curing elastomers in the full or partial presence of oxygen (e.g., using a hot air oven or tunnel, or a steam autoclave). Therefore, organic peroxide compositions comprising one or more drying oils can replace sulfur vulcanization in cure processes where oxygen (e.g., atmospheric oxygen) may be present in various amounts.

According to particular embodiments, the organic peroxide formulations of the present invention are capable of providing a completely or substantially tack-free cured elastomer composition. As used herein, an elastomer composition that is substantially tack-free has a surface tackiness of between 7 and 9.9 or 10, preferably between 8 and 9.9 or 10, more preferably between 9 and 9.9 or 10. An elastomer composition that is completely tack-free has a surface tackiness of 10. A method for measuring surface tackiness is provided herein, and is referred to as the Facial Tissue Paper Test.

Elastomers that are cured using organic peroxide compositions of the present invention may include unsaturated elastomers, saturated elastomers, or combinations thereof, whereas sulfur cure and several types of peroxide cure are generally limited to unsaturated elastomers. U.S. Pat. No. 6,747,099, which is incorporated by reference herein, discloses the use of organic peroxides in the presence of air. Embodiments of the present invention provide improvement over formulations taught in U.S. Pat. No. 6,747,099 that do not provide sufficiently tack-free surfaces when elastomers with little or no unsaturation are used (e.g., EPM). For example, embodiments of the present invention can obtain surface cures with blends of EPDM and EPM (thus significantly reduced unsaturation) substantially identical to those obtained with elastomers that have high unsaturation, such as EPDM. Thus, these embodiments of the invention are not limited by the unsaturation level of elastomers.

According to an embodiment of the present invention, an organic peroxide formulation comprises, consists essentially of, or consists of A) at least one organic peroxide; B) at least one drying oil, and C) at least one free radical trap. The organic peroxide(s) and drying oil(s), and their respective amounts, are preferably selected such that the formulation is capable of curing an elastomer composition in the full or partial presence of oxygen (e.g., using a hot air oven or tunnel, or a steam autoclave). Preferably, the formulation is capable of providing a completely or substantially tack-free elastomer composition. According to particular embodiments, the inclusion of at least one free radical trap provides increased stability of the formulation over time.

According to an embodiment of the present invention, one or more crosslinking coagents and/or one or more free radical traps are also included in the organic peroxide formulation. For example, an organic peroxide formulation may comprise, consist essentially of, or consist of at least one peroxide, at least one drying oil, at least one free radical trap and at least one crosslinking coagent (e.g., one or more bis-, tri- or higher poly-maleimides, bis-, tri- or higher poly-citraconimides, or silicone elastomers, as described in U.S. Pat. No. 6,747,099).

According to another embodiment of the present invention, the organic peroxide formulation comprises, consists essentially of, or consists of at least one peroxide, at least one drying oil, at least one free radical trap, at least one sulfur containing compound, and optionally at least one coagent, wherein the formulation does not include any bis-, tri- or higher poly-maleimides (e.g., N,N'-m-phenylene bis-maleimide, also referred to as HVA-2), or bis-, tri- or higher poly-citraconimides.

With the exception of hydroperoxides and liquid peroxydicarbonates, all those organic peroxides known to undergo decomposition by heat to generate radicals capable of initiating the desired curing (crosslinking) reactions are contemplated as suitable for use in the present invention. Non-limiting examples include dialkyl peroxides, diperoxyketals, mono-peroxy carbonates, cyclic ketone peroxides, diacyl peroxides, organosulfonyl peroxides, peroxyesters and solid, room temperature stable peroxydicarbonates. In at least one embodiment, the organic peroxide is selected from dialkyl peroxides, peroxyketals, cyclic ketone peroxides and diacyl peroxides.

Peroxide names and physical properties for all these classes of organic peroxides can be found in "Organic Peroxides" by Jose Sanchez and Terry N. Myers; Kirk-Othmer Encyclopedia of Chemical Technology, Fourth Ed., Volume 18, (1996), the disclosure of which is incorporated herein by reference.

Illustrative dialkyl peroxide initiators include:
di-t-butyl peroxide;
t-butyl cumyl peroxide;
2,5-di(cumylperoxy)-2,5-dimethyl hexane;
2,5-di(cumylperoxy)-2,5-dimethyl hexyne-3;
4-methyl-4-(t-butylperoxy)-2-pentanol;
4-methyl-4-(t-amylperoxy)-2-pentanol;
4-methyl-4-(cumylperoxy)-2-pentanol;
4-methyl-4-(t-butylperoxy)-2-pentanone;
4-methyl-4-(t-amylperoxy)-2-pentanone;
4-methyl-4-(cumylperoxy)-2-pentanone;
2,5-dimethyl-2,5-di(t-butylperoxy)hexane;
2,5-dimethyl-2,5-di(t-amylperoxy)hexane;
2,5-dimethyl-2,5-di(t-butylperoxy)hexyne-3;
2,5-dimethyl-2,5-di(t-amylperoxy)hexyne-3;
2,5-dimethyl-2-t-butylperoxy-5-hydroperoxyhexane;
2,5-dimethyl-2-cumylperoxy-5-hydroperoxy hexane;
2,5-dimethyl-2-t-amylperoxy-5-hydroperoxyhexane;
m/p-alpha, alpha-di[(t-butylperoxy)isopropyl]benzene;
1,3,5-tris(t-butylperoxyisopropyl)benzene;

1,3,5-tris(t-amylperoxyisopropyl)benzene;
1,3,5-tris(cumylperoxyisopropyl)benzene;
di[1,3-dimethyl-3-(t-butylperoxy)butyl]carbonate;
di[1,3-dimethyl-3-(t-amylperoxy)butyl]carbonate;
di[1,3-dimethyl-3-(cumylperoxy)butyl]carbonate;
di-t-amyl peroxide;
t-amyl cumyl peroxide;
t-butyl-isopropenylcumyl peroxide;
2,4,6-tri(butylperoxy)-s-triazine;
1,3,5-tri[1-(t-butylperoxy)-1-methylethyl]benzene
1,3,5-tri-[(t-butylperoxy)-isopropyl]benzene;
1,3-dimethyl-3-(t-butylperoxy)butanol;
1,3-dimethyl-3-(t-amylperoxy)butanol; and mixtures thereof.

Illustrative solid, room temperature stable peroxydicarbonates include, but are not limited to:
di(2-phenoxyethyl)peroxydicarbonate; di(4-t-butyl-cyclohexyl)peroxydicarbonate; dimyristyl peroxydicarbonate; dibenzyl peroxydicarbonate; and di(isobornyl)peroxydicarbonate.

Another class of dialkylperoxides which may be used singly or in combination with the other free radical initiators contemplated by the present disclosure are those selected from the group represented by the formula:

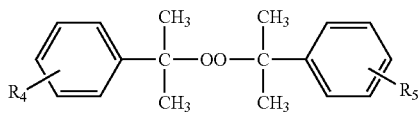

wherein $R_4$ and $R_5$ may independently be in the meta or para positions and are the same or different and are selected from hydrogen or straight or branched chain alkyls of 1 to 6 carbon atoms. Dicumyl peroxide and isopropylcumyl cumyl peroxide are illustrative.

Other dialkyl peroxides include:
3-cumylperoxy-1,3-dimethylbutyl methacrylate;
3-t-butylperoxy-1,3-dimethylbutyl methacrylate;
3-t-amylperoxy-1,3-dimethylbutyl methacrylate;
tri(1,3-dimethyl-3-t-butylperoxy butyloxy)vinyl silane;
1,3-dimethyl-3-(t-butylperoxy)butyl N-[1-{3-(1-methylethenyl)-phenyl}1-methylethyl]carbamate;
1,3-dimethyl-3-(t-amylperoxy)butyl N-[1-{3 (1-methylethenyl)-phenyl}-1-methylethyl]carbamate;
1,3-dimethyl-3-(cumylperoxy))butyl N-[1-{3-(1-methylethenyl)-phenyl}-1-methylethyl]carbamate.

In the group of diperoxyketal initiators, the preferred initiators include:
1,1-di(t-butylperoxy)-3,3,5-trimethylcyclohexane;
1,1-di(t-butylperoxy)cyclohexane;
n-butyl 4,4-di(t-amylperoxy)valerate;
ethyl 3,3-di(t-butylperoxy)butyrate;
2,2-di(t-amylperoxy)propane;
3,6,6,9,9-pentamethyl-3-ethoxycabonylmethyl-1,2,4,5-tetraoxacyclononane;
n-butyl-4,4-bis(t-butylperoxy)valerate;
ethyl-3,3-di(t-amylperoxy)butyrate; and mixtures thereof.

Other peroxides that may be used according to at least one embodiment of the present disclosure include benzoyl peroxide, OO-t-butyl-O-hydrogen-monoperoxy-succinate and OO-t-amyl-O-hydrogen-monoperoxy-succinate.

Illustrative cyclic ketone peroxides are compounds having the general formulae (I), (II) and/or (III).

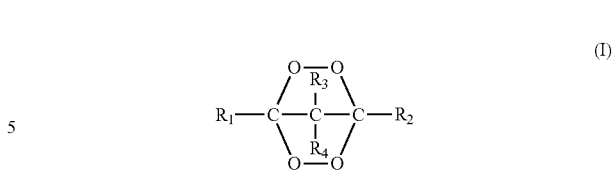

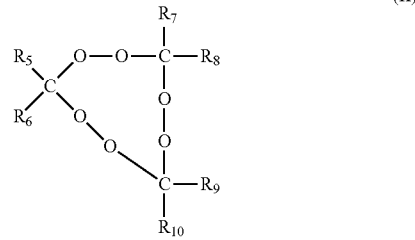

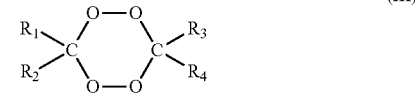

wherein $R_1$ to $R_{10}$ are independently selected from the group consisting of hydrogen, C1 to C20 alkyl, C3 to C20 cycloalkyl, C6 to C20 aryl, C7 to C20 aralkyl and C7 to C20 alkaryl, which groups may include linear or branched alkyl properties and each of $R_1$ to $R_{10}$ may be substituted with one or more groups selected from hydroxy, C1 to C20 alkoxy, linear or branched C1 to C20 alkyl, C6 to C20 aryloxy, halogen, ester, carboxy, nitride and amido, such as, for example, at least 20% of the total active oxygen content of the peroxide mixture used for a crosslinking reaction will be from compounds having formulas (I), (II) and/or (III).

Some examples of suitable cyclic ketone peroxides include:
3,6,9, triethyl-3,6,9-trimethyl-1,4,7-triperoxynonane (or methyl ethyl ketone peroxide cyclic trimer), methyl ethyl ketone peroxide cyclic dimer, and 3,3,6,6,9,9-hexamethyl-1,2,4,5-tetraoxacyclononane.

Illustrative examples of peroxy esters include:
2,5-dimethyl-2,5-di(benzoylperoxy)hexane;
t-butyl perbenzoate;
t-butylperoxy acetate;
t-butylperoxy-2-ethyl hexanoate;
t-amyl perbenzoate;
t-amyl peroxy acetate;
t-butyl peroxy isobutyrate;
3-hydroxy-1,1-dimethyl t-butyl peroxy-2-ethyl hexanoate;
OO-t-amyl-O-hydrogen-monoperoxy succinate;
OO-t-butyl-O-hydrogen-monoperoxy succinate;
di-t-butyl diperoxyphthalate;
t-butylperoxy (3,3,5-trimethylhexanoate);
1,4-bis(t-butylperoxycarbo)cyclohexane;
t-butylperoxy-3,5,5-trimethylhexanoate;
t-butyl-peroxy-(cis-3-carboxy)propionate;
allyl 3-methyl-3-t-butylperoxy butyrate.

Illustrative monoperoxy carbonates include:
OO-t-butyl-O-isopropylmonoperoxy carbonate;
OO-t-butyl-O-(2-ethyl hexyl)monoperoxy carbonate;
1,1,1-tris[2-(t-butylperoxy-carbonyloxy)ethoxymethyl]propane;
1,1,1-tris[2-(t-amylperoxy-carbonyloxy)ethoxymethyl]propane;
1,1,1-tris[2-(cumylperoxy-cabonyloxy)ethoxymethyl]propane;
OO-t-amyl-O-isopropylmonoperoxy carbonate.

Illustrative diacyl peroxides include:
di(4-methylbenzoyl)peroxide;
di(3-methylbenzoyl)peroxide;
di(2-methylbenzoyl)peroxide;
didecanoyl peroxide; dilauroyl peroxide;
2,4-dibromo-benzoyl peroxide;
succinic acid peroxide.
dibenzoyl peroxide;
di(2,4-dichloro-benzoyl)peroxide.

Imido peroxides of the type described in PCT Application publication WO9703961 A1 6 Feb. 1997 are also contemplated as suitable for use and incorporated by reference herein.

Preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate.

More preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butylperoxybenzoate; dibenzoyl peroxide; di(2,4-dichlorobenzoyl)peroxide; cumene hydroperoxide; and di(4-tert-butylcyclohexyl)peroxydicarbonate.

Even more preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl,-1,2,4-trioxepane; m/p-di(t-butylperoxy)diisopropyl benzene; m-di(t-butylperoxy)diisopropyl benzene; p-di(t-butylperoxy)diisopropyl benzene; di-t-butyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; t-butylperoxybenzoate; dibenzoyl peroxide; and di(2,4-dichlorobenzoyl)peroxide.

Most preferred peroxides include one or more of: 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; m/p-di(t-butylperoxy)diisopropyl benzene; m-di(t-butylperoxy)diisopropyl benzene; p-di(t-butylperoxy)diisopropyl benzene; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; and t-butylperoxybenzoate.

In accordance with additional embodiments, organic peroxide formulations of the present invention may further include at least one inert filler, such as silica filler.

According to particular embodiments, the organic peroxide(s) are included in the formulation in an amount from 20 wt % to 99 wt %, or from 30 wt % to 90 wt % or from 40 wt % to 75 wt %, or from 40 wt % to 70 wt %, or from 40 wt % to 65 wt %, or from 45 wt % to 80 wt %, or from 45 wt % to 75 wt %, or from 45 wt % to 70 wt %, or from 45 wt % to 65 wt %, or from 50 wt % to 98 wt %, or from 50 wt % to 75 wt %, or from 50 wt % to 70 wt %, or from 50 wt % to 65 wt %, from 50 wt % to 60 wt %, based on the total organic peroxide formulation.

Any drying oils known to those of ordinary skill in the art can be employed in organic peroxide formulations of the present invention. Drying oils may include oils derived from plant, animal, and fish sources including, for example, glycerol triesters of fatty acids which are characterized by relatively high levels of polyunsaturated fatty acids, especially eleostearic acid and alpha-linolenic acid. According to particular embodiments, the at least one drying oil is selected from the group consisting of: tung oil, hemp oil, biofene or trans-beta-farnesene (made by Amyris), linseed oil, poppy oil, walnut oil, sunflower oil, cottonseed oil, corn oil, soybean oil, sardine oil, herring oil, safflower oil, flax seed oil, perilla oil, and a combination thereof.

The most preferred drying oils are those glycerol triesters of fatty acids which are characterized by relatively high levels of polyunsaturated fatty acids, especially eleostearic acid and alpha-linolenic acid, conjugated double bonded fatty acid of glycerol triesters such as tung oil, and chemically modified esters of linseed oil, with or without the use of acid esters of itaconic acid.

According to at least one embodiment, the drying oil comprises, consists essentially of, or consists of tung oil. According to at least one other embodiment, the drying oil comprises, consists essentially of, or consists of hemp oil.

The ratio of the at least one drying oil to the at least one organic peroxide is not particularly limited, but may be between about 1:about 0.1 and about 1:about 10; for example, about 1:about 0.24, about 1:about 0.40, about 1:about 0.54, about 1:about 0.8, about 1:about 0.9, about 1:about 1, about 1:about 1.8, about 1:about 2.4, about 1:about 3.2, about 1:about 7.2, or about 1:about 9.6.

Embodiments of the invention provide an organic peroxide formulation comprising, consisting essentially of, or consisting of, at least one organic peroxide, at least one drying oil, and at least one free radical trap. Any free radical traps (i.e., any agent that interacts with free radicals and inactivates them for some period of time) known to those of ordinary skill in the art can be employed.

For example, the at least one free radical trap may be selected from the group consisting of nitroxides (e.g., 4-hydroxy-TEMPO) and quinones, such as mono-tert-butylhydroquinone (MTBHQ). As used herein, the term "quinone" includes both quinones and hydroquinones. Non-limiting examples of quinones that may be used in formulations of the present invention include mono-tert-butylhydroquinone (MTBHQ), hydroquinone; hydroquinone mono-methyl ether (HQMME) also known as 4-methoxy phenol also known as (MEHQ) CAS #150-76-5; mono-t-amyl hydroquinone; hydroquinone bis(2-hydroxyethyl) ether; 4-ethoxy phenol; 4-phenoxy phenol; 4-(benzyloxy) phenol; 2,5-bis (morpholinomethyl) hydroquinone, and benzoquinone.

In accordance with additional embodiments, organic peroxide formulations of the present invention may further comprise, consist essentially of, or consist of, at least one coagent and/or at least one filler. Non-limiting examples of co-agents include allyl methacrylate, triallyl cyanurate, triallyl isocyanurate, trimethyloylpropane trimethacrylate (SR-350), trimethyloylpropane triacrylate (SR-351), zinc diacrylate, and zinc dimethacrylate. According to particular embodiments, the ratio of the coagent(s) to the organic peroxide(s) used in the formulation (coagent:peroxide) can be between about 0.1:about 1.0 and about 1.5:about 1.0.

Non-limiting examples of suitable inert fillers for use in the organic peroxide formulations of the present invention include water washed clay, e.g., Burgess Clay, precipitated silica, precipitated calcium carbonate, synthetic calcium silicate, and combinations thereof. Various combinations of these fillers can be used by one skilled in the art to achieve a free-flowing, non-caking final peroxide formulation. According to particular embodiments, the amount of filler in the organic peroxide formulation can range from about 0.1 wt % to about 90 wt %, depending upon the type of peroxide and additives used, more preferably from about 0.5 wt % to about 70 wt %, most preferably from about 1 wt % to about 60%.

According to particular embodiments, the organic peroxide formulations of the present invention do not include a silica filler.

Embodiments of organic peroxide formulations described herein may also further comprise, consist essentially of, or consist of, a sulfur accelerator, i.e., a sulfur containing compound capable of accelerating sulfur vulcanization of polymers, which are capable of being crosslinked by sulfur.

Exemplary sulfur accelerators are well known in the art. Many different classes of these compounds are known and all are contemplated as equivalent. The disulfides and trisulfides may be biobased (e.g., garlic and onion oils) or non-biobased compounds.

The Vanderbilt Rubber Handbook, thirteenth edition, 1990, R.T. Vanderbilt Company, Inc., publisher lists many types of sulfur accelerators, the disclosure of which is incorporated herein by reference. Illustrative of these are derivatives of benzothiazoles, thiadiazoles, sulfenamides, sulfenimides, dithiocarbamates, thiurams, imidazoles, xanthates, and thioureas. Also included in this general class of sulfur compound sulfur accelerators are sulfides, disulfides (e.g., diallyldisulfide) polysulfides and arylpolysulfide compounds such as the amylphenol polysulfides e.g. VULTAC® products from Arkema and other sulfides such as disulfide and/or other known sulfur accelerating polysulfide phosphate, dithiophosphates and/or phosphorous and sulfur containing compounds. Other sulfur containing organic compounds capable of sulfur donation at vulcanization temperatures which are known but are not presently used for such reactions because of cost concerns are also contemplated as equivalents. Illustrative of these is the compound 2-(2,4-cyclopentadiene-1-ylidene)-1,3-dithiolane.

Preferred sulfur accelerators include Vultac® 5=poly(t-amylphenol disulfide); Vultac® 7=poly(t-butylphenol disulfide); Vanax® A=DTDM=4,4-dithiodimorpholine; Altax®=MBTS=benzothiazyl disulfide; CLD-80=N,N'-Caprolactam disulfide; zinc di-n-butyldithiocarbamate; tetramethylthiuram disulfide; dipentamethylene thiuram tetrasulfide; tetrabutylthiuram disulfide; tetramethylthiuram monosulfide, mercaptobenzothiazole disulfide; mercaptobenzothiazole; mercaptotoluimidazole; zinc-2-mercaptotoluimidazole; and 4-morpholinyl-2-benzothiazole disulfide.

In at least one embodiment, one sulfur accelerator class includes salts of disubstituted dithiocarbamic acid.

These salts have the general structure:

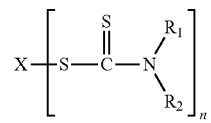

wherein X is an ion derived from a metal selected from the group consisting of nickel, cobalt, iron, chromium, tin, zinc, copper, lead, bismuth, cadmium, selenium and tellurium, or X is a quaternary ammonium ion, n may vary from 1 to 6 and is equal to the number of formal positive charges on the X ion, and $R_1$ and $R_2$ are independently alkyl of 1 to 7 carbon atoms.

Examples of the salts of disubstituted dithiocarbamic acid include:
bismuth dimethyldithiocarbamate;
cadmium diethyldithiocarbamate;
cadmium diamyldithiocarbamate;
copper dimethyldithiocarbamate;
lead diamyldithiocarbamate;
lead dimethyldithiocarbamate;
selenium diethyldithiocarbamate;
selenium dimethyldithiocarbamate;
tellurium diethyldithiocarbamate;
piperidinium pentamethylene dithiocarbamate;
zinc diamyldithiocarbamate;
zinc diisobutyldithiocarbamate
zinc diethyldithiocarbamate;
zinc dimethyldithiocarbamate;
copper dibutyldithiocarbamate;
sodium dimethyldithiocarbamate;
sodium diethyldithiocarbamate;
sodium dibutyldithiocarbamate;
zinc di-n-butyldithiocarbamate;
zinc dibenzyldithiocarbamate.

A second sulfur accelerator class suitable for use in the organic peroxide formulation comprises the thiurams. These are prepared from secondary amines and carbon disulfide and possess the general structure:

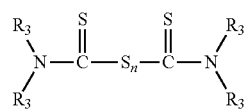

wherein $R_3$ is an alkyl group of from 1 to about 7 carbon atoms or the $R_3$ groups on each particular nitrogen atom may be concatenated to form, together with the nitrogen atom on which they are attached, a five, six or seven membered heterocyclic ring containing 4, 5 or 6 carbon atoms respectively and n may have a positive value from greater than zero up to 6.

Examples of thiuram sulfur accelerators include:
dipentamethylenethiuram tetrasulfide and hexasulfide;
tetrabutylthiuram disulfide;
tetramethylthiuram disulfide;

tetraethylthiuram disulfide;
tetramethylthiuram monosulfide;
isobutylthiuram disulfide;
dibenzylthiuram disulfide;
tetrabenzylthiuram disulfide;
tetraisobutylthiuram disulfide;
isobutylthiuram monosulfide;
dibenzylthiuram monosulfide;
tetrabenzylthiuram monosulfide;
tetraisobutylthiuram monosulfide.

The higher multisulfides of the various thiurams are also sulfur donors. Derivatives of thiadiazoles are, but not limited to, monobenzoyl derivatives of dimercaptothiadiazole (2,5-dimethyl-1,3,4-thiadiazole); the proprietary thiadiazole of the Vanderbilt Rubber Company identified as VANAX® 189; 1,2,4-thiadiazole, 5-ethoxy-3-(trichloromethyl)thiadiazole; and alkyl mercaptothiadiazoles, e.g. methyl mercapto thiadiazole.

Derivatives of benzothiazoles have the general structure:

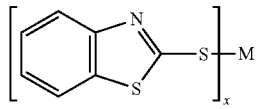

wherein M is a direct bond between two sulfur atoms, H, or an ion derived from a metal selected from the group consisting of nickel, cobalt, iron, chromium, tin, zinc, copper, lead, bismuth, cadmium, selenium and tellurium; and when M is H, x is 1; when M is a direct bond between two sulfur atoms, x is 1 or 2; and when M is an ion derived from a metal, x is equal to the formal valence of the metal ion; and if M is a direct bond between two sulfur atoms and x is 1, then the second sulfur atom to which the M bond is attached is also bonded to a 4-morpholinyl radical.

Illustrative compounds include: 2-(4-morpholinodithio) benzothiazole; benzothiazyl disulfide; 2-mercapto-benzothiazole; 2-mercaptobenzothiazole disulfide; sodium-2-mercaptobenzothiazolate; zinc-2-mercapto-benzothiazole; copper-2-mercaptobenzothiazolate; 2-N-cyclohexylaminobenzothiazole; N-cyclohexylamino-2-benzothiazole polysulfide; 2-bisbenzothiazole-2,2-polysulfide and 2-bisbenzothiazole-2,2-disulfide; bis(2,2'-benzothiazyldisulfide).

The sulfenamide accelerators are also well known. Illustrative examples include: N-oxydiethylene-2-benzothiazole sulfenamide; N-oxydiethylene thiocarbamyl-N-oxydiethylene sulfenamide; N-cyclohexyl-2-benzothiazole sulfenamide; N-t-butyl-2-benzothiazole sulfenamide; N-cyclohexyl-2-benzothiazylsulfeneamide; N,N-dicyclohexyl benzthiazyl sulfenamide; and N-t-butyl-2-benzothiazole sulfenamide. There are also sulfenimide compounds, e.g., N-t-butyl-benzothiazole-2-sulfenimide.

Typical imidazoles include: 2-mercaptobenzimidazole, 2-mercaptomethylbenzimidazole; and the zinc salt of 2-mercaptobenzimidazole.

Zinc isopropyl xanthate is a typical xanthate sulfur accelerator.

Typical thioureas include: trimethylthiourea; 1,3-diethylthiourea and 1,3-dibutylthiourea; ethylene thiourea; blend of dialkyl thioureas; diphenyl thiourea; diorthotolyl thiourea; dimethyl thiourea; diethyl thiourea; and dibutyl thiourea.

Alkylphenoldisulfide types of sulfur accelerators are illustrated by the compounds available from Arkema, under the designation VULTAC® 2, VULTAC® 3 and VULTAC® 5.

Thiophosphate sulfur accelerators are illustrated by such compounds as copper dialkyldithiophosphate; zinc dialkyldithiophosphate; zinc amine dithiophosphate; zinc dibutyldithophosphate; copper O,O-diisopropyl-phosphorodithiolate; and zinc O,O-diisopropylphosphorodithiolate.

Other miscellaneous sulfur accelerators include 4,4-dithiodimorpholine; N,N'-caprolactam disulfide; and dibutylxanthogen disulfide.

Illustrative sulfur-containing compounds include but are not limited to:
Vultac® 5=poly(t-amylphenol disulfide);
Vultac® 7=poly(t-butylphenol disulfide);
Vanax® A=DTDM=4,4-dithiodimorpholine;
Altax®=MBTS=benzothiazyl disulfide;
and
CLD-80=N,N'-Caprolactam disulfide.

According to at least one embodiment, the organic peroxide formulation of the present invention comprises, consists essentially of, or consists of A) at least one organic peroxide; B) at least one drying oil comprising Tung oil; C) at least one free radical trap; D) at least one optional coagent; E) at least one optional filler; and F) at least one optional sulfur accelerator, wherein the amounts of each of the components are selected such that the formulation is capable of curing an elastomer composition in the full or partial presence of oxygen. Preferably, the formulation is capable of providing a completely or substantially tack-free elastomer composition.

According to at least one embodiment, the organic peroxide formulation of the present invention comprises, consists essentially of, or consists of A) at least one organic peroxide; B) at least one drying oil comprising Tung oil; C) at least one free radical trap; D) at least one coagent; E) at least one filler; and F) at least one sulfur accelerator, wherein the amounts of each of the components are selected such that the formulation is capable of curing an elastomer composition in the full or partial presence of oxygen. Preferably, the formulation is capable of providing a completely or substantially tack-free elastomer composition.

According to at least one embodiment, the organic peroxide formulation of the present invention comprises, consists essentially of, or consists of A) at least one organic peroxide; B) at least one drying oil comprising hemp oil; C) at least one free radical trap; D) at least one optional coagent; E) at least one optional filler; and F) at least one optional sulfur accelerator, wherein the amounts of each of the components are selected such that the formulation is capable of curing an elastomer composition in the full or partial presence of oxygen. Preferably, the formulation is capable of providing a completely or substantially tack-free elastomer composition.

According to at least one embodiment, the organic peroxide formulation of the present invention comprises, consists essentially of, or consists of A) at least one organic peroxide; B) at least one drying oil comprising hemp oil; C) at least one free radical trap; D) at least one coagent; E) at least one filler; and F) at least one sulfur accelerator, wherein the amounts of each of the components are selected such that the formulation is capable of curing an elastomer composition in the full or partial presence of oxygen. Preferably, the formulation is capable of providing a completely or substantially tack-free elastomer composition.

Additional embodiments of the present invention provide elastomer compositions comprising, consisting essentially of, or consisting of:
A) at least one elastomer (either saturated, unsaturated, or both);

B) at least one organic peroxide,
C) at least one drying oil, and
D) at least one free radical trap;
wherein the elastomer composition is curable in the full or partial presence of oxygen (e.g., using a hot air oven or tunnel, or a steam autoclave). Preferably, the cured elastomer composition is completely or substantially tack-free. A method for measuring surface tackiness is provided herein, and is referred to as the Facial Tissue Paper Test.

According to particular embodiments, the one or more drying oils are included in the elastomer compositions in amounts ranging from about 0.05 phr (parts per hundred rubber) to about 20.0 phr, from about 0.05 phr to about 10.0 phr, from about 0.05 phr to about 8.0 phr, from about 0.05 phr to about 5.0 phr, from about 0.05 phr to about 3.0 phr, from about 0.10 phr to about 10.0 phr, from about 0.10 phr to about 8.0 phr, from about 0.10 phr to about 6.0 phr, from about 0.5 phr to about 8.0 phr, or from about 1.0 phr to about 6.0 phr.

According to particular embodiments, the one or more organic peroxides are included in the elastomer compositions in amounts ranging from about 0.05 phr to about 15 phr, preferably from about 1 phr to about 10 phr, more preferably from about 2 phr to about 8 phr, even more preferably from about 3 phr to about 6 phr. The time and temperature conditions necessary for curing typically depend on the structure of the organic peroxide used.

According to particular embodiments, the one or more free radical traps are included in the elastomer compositions in amounts ranging from about 0.001 phr to about 7 phr, about 0.01 phr to about 4 phr, preferably from about 0.1 phr to about 3.5 phr, more preferably from about 0.5 phr to about 3.0 phr, even more preferably from about 0.75 phr to about 2.5 phr.

In at least one embodiment, the elastomer composition may comprise a saturated elastomer, an unsaturated elastomer, or both a saturated and unsaturated elastomer.

According to particular embodiments, the elastomer composition further comprises at least one polymer. The at least one polymer of the elastomer composition may comprise a saturated polymer, an unsaturated polymer, or both a saturated and unsaturated polymer.

It should be noted that commercially-available pre-compounded elastomers may be used in accordance with the present invention. These elastomers may contain additives such as carbon black filler, process oils, mold release agents, antioxidants and/or heat stabilizers.

As used herein, the term "polymer" means a non-elastomeric polymer comprised of at least at least one monomer. The term "polymer" encompasses homopolymers and copolymers, where the term "copolymers" refers to a non-elastomeric polymer comprised of at least two different monomers in polymerized form. For example, a copolymer in accordance with the present disclosure may be a polymer comprising two different monomers, a terpolymer comprising three different monomers, or a polymer comprising more than three different monomers.

In at least one embodiment, the polymer of the elastomer composition comprises a copolymer. The embodiments disclosed herein recite elastomer compositions comprising a copolymer. However, as one of ordinary skill in the art would readily appreciate, a homopolymer may be substituted in any embodiment comprising a copolymer, unless expressly indicated to the contrary.

In at least one embodiment, the elastomer composition comprises at least one elastomer and at least one copolymer. The elastomer and copolymer may be present in the elastomer composition at weight ratios ranging from 99:1 to 1:99, such as, for example, from 85:15 to 15:85, or from 75:25 to 25:75. In at least one embodiment, the elastomer and copolymer are present in the elastomer composition in a 50:50 weight ratio.

Non-limiting examples of elastomers and polymers suitable for use in accordance with the present invention include the various known grades of ethylene-propylene terpolymer (EPDM) (e.g., Vistalon®), 5-vinyl-2-norbornene-EPDM (e.g, Keltan® ACE EPDM), ethylene-propylene copolymer (EPM), poly(ethylene-α-olefins), poly(ethylene-octene) (e.g., Engage®), poly(ethylene-hexene), poly(ethylene-butylene) (e.g., Tafmer®), poly(ethylene-heptene), poly(ethylene-butene), natural polyisoprene rubber (NR), styrene butadiene rubber (SBR), polybutadiene rubber (BR), synthetic polyisoprene rubber (IR), poly(ethylene) (PE), high-density polyethylene (HDPE), linear low-density polyethylene (LLDPE), low-density polyethylene (LDPE), poly(ethylene-vinyl acetate) (EVA), styrene-butadiene-styrene block copolymers (SBS), styrene-isoprene-styrene block copolymers (SIS), neoprene rubber (CR), bromobutyl rubber (BIIR), chlorobutyl rubber, nitrile rubber (NBR), hydrogenated nitrile butadiene rubber (HNBR), polysulfide rubber, chlorinated poly(ethylene) (CM or CPE), polyurethane (AU, EU), vinylidene fluoride copolymers (CFM), silicone rubber (PMQ), vinyl silicone rubber (VMQ, PVMQ), poly(ethylene methylacrylate) (ACM), chlorosulfonated poly(ethylene) (CSM), fluorosilicone rubber (FVMQ), fluoroelastomer (FKM), and mixtures thereof.

According to at least one embodiment, the elastomer composition comprises at least one saturated elastomer. The saturated elastomer can be selected from, for example, silicon rubber without unsaturation (Q), methyl-polysiloxane (MQ), phenyl-methyl-polysiloxane (PMQ), ethylene-vinyl acetate (EVA), high-density polyethylene (HDPE), low-density polyethylene (LDPE), chlorinated poly(ethylene) (CPE), poly(ethylene propylene) (EPM), fluoroelastomers (FKM, FFKM) (e.g., Viton® and Dyneon®), and combinations thereof.

According to at least one embodiment, the elastomer composition comprises at least one unsaturated elastomer. Unsaturated elastomers that may be used in the elastomer composition include, for example, ethylene-propylene-diene terpolymer (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber (BIIR), chlorobutyl rubber, and combinations thereof.

In accordance with at least one embodiment, the elastomer composition comprises at least one saturated copolymer. Non-limiting examples of saturated polymers that may be used include copolymers of ethylene with propylene, butylene, pentene, hexane, heptane, octane, and vinyl acetate, such as, linear low density polyethylene (LLDPE), low density polyethylene (LDPE), poly(ethylene vinyl acetate) (EVA), poly(ethylene propylene) (EPM), poly(ethylene-octene) (e.g., Engage®), poly(ethylene-hexene), poly(ethylene-butylene) (e.g., Tafmer®), Vamac® polymers (e.g., poly(ethylene-methyl acrylate), poly(ethylene-acrylate), and combinations with acrylic acid), and combinations thereof.

When a foamed product is desired, the elastomer composition may comprise a blowing agent.

At least one embodiment of the present invention relates to a method for manufacturing an article comprising an elastomer composition as described herein, wherein the method comprises curing the elastomer composition in the full or partial presence of oxygen (e.g., using a hot air oven or tunnel, or a steam autoclave).

As used herein, the term "curing" refers to the crosslinking of polymer chains to form a strengthened or hardened polymer. A curing, or crosslinking, step may be performed in any conventional manner, such as, for example, hot air, steam, or hot molding.

The method may comprise extruding an elastomer composition, as described herein, to form an uncured preform article, and curing the uncured preform article. The elastomer composition may be extruded in the presence of hot air to form the uncured preform. In at least one embodiment, the preform is cured using microwaves or a steam autoclave. In at least one other embodiment, the preform is cured without using microwaves or a steam autoclave.

In at least one embodiment, the extruded profile is heated in a microwave zone in the presence of air directly from the extruder, then passed through a longer heated air tunnel to complete the cure of the elastomeric profile.

The method for manufacturing the article may be performed in a hot air tunnel, or any other apparatus.

The elastomer compositions of the present inventions are preferably extruded in the presence of air, instead of molded inside a mold that excludes air.

In at least one embodiment, the method for manufacturing the article can be formed continuously. Continuous manufacturing may allow for the production of a continuous article, such as a continuous seal, as opposed to seals that must be pieced together from smaller parts.

At least one embodiment of the present disclosure relates to a method for manufacturing hose. The method may comprise extruding a length of hose from an elastomer composition without curing the length of hose. The length of uncured hose may be collected and then cured, such as by exposing the uncured hose to steam.

At least one embodiment of the present invention relates to a process for curing an elastomer composition, the process comprising curing the elastomer composition in the presence of oxygen, wherein the composition comprises
  A) at least one elastomer;
  B) at least one organic peroxide,
  C) at least one drying oil, and
  D) at least one free radical trap. The process may further comprise mixing the components A)-D) to provide the elastomer composition.

In at least one embodiment, conventional additives such as anti-oxidants (e.g., hindered phenols and polymeric quinoline derivatives), aliphatic process oils, and other process aids, pigments, dyes, tackifiers, waxes, reinforcing aids, UV stabilization agents, blowing agents and activators and antiozonants may also be added to the elastomer compositions before, after and/or during the curing step.

According to particular embodiments, an elastomer composition of the present invention comprising, consisting essentially of, or consisting of A) at least one elastomer (either saturated, unsaturated, or both); B) at least one organic peroxide, C) at least one drying oil, and D) at least one free radical trap, which has been cured in the full or partial presence of oxygen, has less surface tackiness in comparison to an elastomer composition that has been cured according to an identical process and that has an identical composition except that it does not include any drying oils.

Embodiments of the present invention also provide an elastomeric article comprising a cured elastomer composition as described herein. Preferably, the elastomeric article is completely or substantially tack-free. According to particular embodiments, the elastomeric article is a non-coating type (i.e., not a liquid coating). In at least one embodiment, the article may comprise a seal, hose, or gasket. Exemplary elastomeric articles that may be made in accordance with the compositions and methods of the present invention include O-rings, gaskets, diaphragms, seals, grommets, electrical insulators, shoe soles, septa, fittings, shrouds, sheets, belts, tubes, etc. The present disclosure also relates to automotive, industrial, or residential seals manufactured according to the compositions and methods disclosed herein.

The embodiments described herein are intended to be exemplary of the invention and not limitations thereof. One skilled in the art will appreciate that modifications to the embodiments and examples of the present disclosure may be made without departing the scope of the present disclosure. The embodiments of the invention are described above using the term "comprising" and variations thereof. However, it is the intent of the inventors that the term "comprising" may be substituted in any of the embodiments described herein with "consisting of" and "consisting essentially of" without departing the scope of the invention.

The following examples further illustrate the best mode contemplated by the inventors for the practice of their invention and are to be construed as illustrative and not in limitation thereof.

TESTS AND PROCEDURES

Procedure for Mixing Rubber and Rubber Sheet Preparation

The following procedure was used for mixing rubber and preparing the rubber sheet for hot air curing. A Brabender Plasti-Corder® with a 50 ml capacity bowl that is jacketed with the ability to run room temperature or heated oil was used. The mixer was equipped with removable sigma type blades. Using the specific gravity provided with the pre-compounded elastomer, small strips of rubber were slowly added to the bowl at a mixing speed of 20 to 25 rpm. The total amount of rubber added to the Brabender Plasti-Corder® bowl was equivalent to the weight needed to provide 48 ml of rubber volume so that there was sufficient volume to add the peroxide curatives to the rubber.

Out of this 48 ml of rubber, two small strips of rubber (equivalent to about 4 grams or no more than 5 ml) were held in reserve. All the rest of the rubber was slowly added to the bowl. Once all the rubber was added to the mixer and the rubber was flowing in the bowl, the mixer rpm was reduced to 15 rpm and the peroxide formulation for that experiment, which was pre-weighed in small Dixie® cups on a minimum of a three place balance for good accuracy, was slowly added to the mixing rubber. To make sure all of the residual peroxide was included in the mixing rubber, the two small reserve rubber strips were used to wipe the powder off the V-shaped metal portion of the mixer. This powder adhered to the rubber strip and the remaining two strips of rubber were introduced into the mixer.

The rpm was then increased back to 25 rpm for three minutes. After this time, the mixer speed was lowered to 10 rpm and the mixer head was unbolted and removed. Once the blades were no longer turning, the rubber around the blades was safely removed and placed on a sheet of Mylar® polyester. There was a small amount of rubber that was located at the head of the mixer blades within the inner hollow portion of the mixing chamber, which was removed last. The mixer head was re-assembled with the bolts and the mixer motor was started again at 20 rpm. The rubber which was removed last, which was trapped in the mixing chamber, was added first to the spinning blades, followed by the rubber that was taken off the blades. This provided for a more uniform mixing of elastomer. The rpm was then increased to 25 rpm and held there for 3 minutes. After this time, the mixer speed was set to 10 rpm and the mixer head unbolted and removed. Once removed, the mixer blade motion stopped and it was again safe to remove all of the rubber from the mixer's bowl and blades.

The warm rubber was then formed into a tight ball and placed between two Mylar® polyester sheets. This sandwich was placed in a warmed hydraulic powered Carver press where the press may be set to between room temperature and 60° C., depending upon the elastomer and the peroxide curatives being used. The ball of rubber was pressed flat between the two heavy Mylar® polyester sheets. Wearing nitrile gloves, the press was opened and the Mylar® polyester sheet sandwich containing the flattened rubber was removed. The top sheet was removed and the rubber was rolled into a tube. This was re-sandwiched and flattened again. The sheet was rolled again, but 90 degrees to the original roll direction, and flattened again. This was repeated a third time, and care was taken to flatten to an approximate thickness of ⅛ inch. The sandwich was placed on the bench top and covered with a metal sheet where the rubber was allowed to cool. It was then removed and stored in a tightly-sealed polyethylene bag. These sheets were then cut with scissors or using a sharp metal circle punch, to make small flat circle sheets of uncured rubber for the Rheometer cure evaluation, and square flat sheets for the hot air oven testing using the "Facial Tissue Paper Test" described below.

Facial Tissue Paper Test

The following procedure was used to test the surface tack of the rubber sheet after curing in a hot air oven. This procedure is also referred to as a "Facial Tissue Paper Test" for surface tackiness of a rubber sheet cured in a hot air oven.

A flat sheet of uncured rubber was prepared with dimensions of ⅛" thick by 2" wide and 3" long, and was hung carefully in a pre-heated hot air oven set to 205° C. for 15 minutes. The sheet was hung in the oven by metal clamps from a metal rack to expose all sides of the sheet to the hot air. After 15 minutes of cure, the rubber sheet was promptly removed and placed on an aluminum foil-covered piece of cardboard. It was covered immediately with a Kleenex® Facial Tissue and very firm pressure was immediately applied by hand to the entire rubber surface, followed by applying a 1800 gram weight for five minutes. After the rubber cooled to room temperature, the soft facial tissue paper was carefully removed to visually examine the rubber surface for any tissue paper fibers that may have adhered to the surface. If a great many tissue paper fibers adhere, this indicates a poor surface cure, or one that has a high amount of surface tackiness.

As used herein, the Surface Tackiness Number=(% of surface with no paper fibers÷10). The Surface Tackiness number can range from 10 to 0. A completely tack-free cured rubber surface with no tissue paper fibers has a rating of 10. A very poorly cured rubber surface that is completely covered in tissue paper fibers is rated a 0. If 90% of the surface has no tissue paper fibers attached, the rating is a 9, if 70% of the surface has no tissue paper fibers attached, the rating is a 7, etc.

Rheometer Procedures

The following procedure was used for moving die rheometer and RPA (Rubber Process Analzer) evaluations. For the Alpha Technologies MDR rheometer, test method ASTM D5289-12 "Standard Test Method for Rubber Property—Vulcanization Using Rotorless Cure Meters" was used. Test method ASTM D6204 was used with either a 0.5 degree or 1.0 degree arc and 100 cpm frequency of oscillation at cure temperatures appropriate for the curative system, e.g., 185° C. for the examples below.

When conducting rheometer evaluations, approximately 5 to 6 grams of elastomer (depending upon the density of the final compound) were used to completely fill the upper and lower dies of the rheometer. The uncured rubber was cut from the pressed sheet formed by the procedure described above. The rubber was cut into small round discs about 1.25 inches in diameter and placed between two Dartek® sheets. This sandwich was then placed in the rheometer for testing following ASTM D5289.

Following ASTM D6601 for after cure dynamic testing, a test with the RPA using the stress relaxation feature of the instrument with a 3 degree arc applied strain was applied to gauge the crosslinked elastomer's ability to serve as a gasket or seal. This purpose was very similar to the percent compression test following standard NF ISO 815. The loss of the elastic modulus or S' (dN-m) is followed versus time, for several minutes. The rate in loss of elastic modulus reflects the percent compression set performance. The lowest percent compression values for cured rubber samples will have the lowest loss in the elastic modulus or S' (dN-m) over a one minute period at a test temperature of 185° C. or higher.

% Compression Set Procedures

The following procedures were used for compression set evaluations. The standardized test methods for % compression set were NF ISO 815 and/or ASTM D395, which are suitable for Ambient and High Temperature application testing. Specifically, in Example 1, NF ISO 815 was used, wherein samples for the test were first cured at 190° C. to form a cylinder of 6.3±0.3 mm height and 13±0.5 mm diameter using a curing time of Tc90+8 minutes, then test pieces were placed in the NF ISO 815 device to compress 25% at 150° C. for 24 hours. After this time, samples were released and placed on a wooden board at ambient temperature for 30 minutes before being measured for change in height.

Tensile Testing Procedures

The following procedures were used for tensile testing. Tensile properties were determined by following the standard NF ISO 37 and/or ASTM D412. First, sheets of 1.5 mm thick were cured under pressure in a pneumatic press. The conditions of curing were determined from the Tc90 (minute) 90% of cure time result for the compound when tested on the MDR or RPA rheometer at 190° C. The curing temperature was 190° C. and the curing time was Tc90+8 minutes. Then, dumbbells were cut from the 1.5 mm cured sheet using the appropriate die designated by NF ISO 37 and/or ASTM D412. Finally, tensile tests were performed on the dumbbells using an INSTRON® 5565 tensile machine. A speed of 200 mm/min was used.

ABBREVIATIONS USED FOR THE RPA RHEOMETER TEST

ML (dN-m) is the minimum torque in deci-Newton-meters in a RPA rheometer test and relates to the viscosity of the elastomer composition at the test temperature.

MH (dN-m) is the maximum torque in deci-Newton-meters in a RPA rheometer test and relates to the maximum amount of crosslinking attained.

MH−ML (dN-m) is the relative degree of crosslinking in deci-Newton-meters; sometimes called "Delta" Torque Ts1 (min) is the time to attain a 1 dN-m increase from the minimum torque in minutes Ts2 (min) is the time to attain a 2 dN-m increase from the minimum torque in minutes Tc50 (min) is the time to attain 50% of the MH−ML (dN-m) cure state in minutes from the minimum torque.

Tc90 (min) is the time to attain 90% of the MH−ML (dN-m) cure state in minutes, from the minimum torque.

ABBREVIATIONS USED IN THE EXAMPLES

4-Hydroxy TEMPO or 4-OHT is 4-hydroxy-2,2,6,6-tetramethylpiperidin-1-oxyl.

Di-Cup® R is 99+% dicumyl peroxide from Arkema Inc.

Di-Cup® 40C is 40% dicumyl peroxide on calcium carbonate filler from Arkema Inc.

EVA is poly(ethylene vinyl acetate) copolymer

Kleenex® is facial tissue available from Kimberly-Clark.

Luperox® 101 is 2,5-dimethyl-2,5-di(t-butylperoxy)hexane (93% to 95% peroxide content) available from Arkema.

MBTS is benzothiazyl disulfide, also called mercaptobenzothiazole disulfide, also called Altax® from R. T. Vanderbilt MTBHQ is mono-tertiary butyl hydroquinone, CAS 1948-33-0.

N550 Carbon Black is where N550 is an ASTM designation for a particle size of carbon black MgO is Magnesium Oxide Naugard® 445 is 4,4'-bis(α,-dimethylbenzyl)diphenylamine, an antioxidant from Chemtura phr means parts of ingredient added for every 100 parts of pure rubber in the formulation.

PEG is Poly(ethylene glycol)

Poly(ethylene α-olefin) is a Poly(ethylene octene) copolymer from Dow known as Engage®

Primol® 352 is a white oil (100% non-aromatic) from ExxonMobil.

Luperox® F90P is m/p-di(t-butylperoxy)diisopropyl benzene (90% peroxide content) from Arkema.

Luperox® TBEC is t-butyl-2-ethylhexyl)monoperoxycarbonate.

Sunpar® 2280 is a paraffinic type process oil from Sunoco

SR-350 or TMPTMA is a crosslinking coagent; or trimethylolpropane trimethacrylate from Arkema.

SR-351 is a crosslinking coagent; trimethylolpropane triacrylate from Arkema.

TAC is triallyl cyanurate a crosslinking coagent from Evonik

TAIC is triallyl isocyanurate a crosslinking coagent from Mitsubishi Intl.

TMPTMA is a crosslinking coagent; Sartomer SR-350; or trimethylolpropane trimethacrylate from Arkema.

TMQ or Stanguard® TMQ Powder is 2,2,4-trimethyl-1,2-dihydroquinoline, CAS #26780-96-1 from Harwick Standard Distribution Corporation Tung Oil is a pure, or substantially pure, bio-based oil preferably obtained by cold pressing seed from the nut of the Tung tree Vamac® DP, is a peroxide curable poly(ethylene acrylic) elastomer from Chemours Vanax® MBM is N, N'-m-phenylenedimaleimide a crosslinking coagent from R. T. Vanderbilt also known as HVA-2 from DuPont.

Vanfre® VAM is Polyoxyethylene octadecyl ether phosphate a recommended processing aid for the elastomer, VAMAC® DP an ethylene/acrylic copolymer, Vanfre® VAM is available from R. T. Vanderbilt Vistalon® 2504 EPDM is an poly(ethylene propylene diene) terpolymer elastomer sold by ExxonMobil; 50% ethylene, 4.7% ethylidene norbornene (ENB); ML(1+4)@125C, 25MU Vul-Cup® 40KE is m/p-di-t-butylperoxydiisopropylbenzene at 40% peroxide content on Burgess KE Clay Vultac® 5 is t-amyl phenol disulfide polymer, an arylpolysulfide polymer/oligomer also referred to as a poly(t-amylphenol disulfide); available from Arkema.

EXAMPLES

Example 1

In this example, tung oil was used in combination with an organic peroxide Vul-Cup® 40KE to cure the EPDM formulation of TABLE 1, resulting in a tack-free rubber surface. Samples were cured for 15 minutes in a 205° C. hot air oven, and then subjected to the Facial Tissue Paper Test to assess tackiness. For the tung oil, loading levels of 0.5 phr and below were tested.

TABLE 1

| "EPDM MB" Masterbatch Formulation | |
|---|---|
| Ingredient | Phr |
| Vistalon ® 2504 EPDM | 100.0 |
| N550 Carbon Black | 100.0 |
| Primol ® 352 white process oil | 40.0 |
| PEG Polyethylene glycol | 3.0 |
| Stanguard ® TMQ powder antioxidant | 1.0 |
| Total weight of the masterbatch | 244.0 |

TABLE 2

| Sample # | 1 | 2 | 3 | 4 | 5 |
|---|---|---|---|---|---|
| Parts of EPDM MB (Table 1) | 244 | 244 | 244 | 244 | 244 |
| phr Vul-Cup® 40KE | 6 | 6 | 6 | 6 | 6 |
| phr Tung Oil | 0 | 0.1 | 0.2 | 0.3 | 0.5 |
| Total parts | 250 | 250.1 | 250.2 | 250.3 | 250.5 |
| RPA Rheometer Study at 182° C., 1 deg arc, 100 cpm | | | | | |
| MH (dN-m) | 35.18 | 36.40 | 36.47 | 36.85 | 37.96 |
| ML (dN-m) | 4.55 | 4.68 | 4.70 | 4.71 | 4.73 |
| MH – ML (dN-m) or "Delta" | 30.63 | 31.71 | 31.77 | 32.14 | 33.23 |
| % Delta Increase vs. Sample 1 | — | 3.54% | 3.71% | 4.95% | 8.49% |
| Ts2 (min) | 0.37 | 0.37 | 0.37 | 0.37 | 0.37 |
| Tc90 (min) | 3.88 | 3.86 | 3.84 | 3.83 | 3.83 |
| Facial tissue paper test: 10 = non-tacky, 0 = very tacky | 0 | 10 | 10 | 10 | 10 |

The results in TABLE 2 show that, at even at a low loading level of 0.1 phr tung oil (0.1 parts tung oil per 100 parts of rubber, i.e., 100 parts of Vistalon® EPDM in the masterbatch formulation), a dramatically improved tack-free surface was obtained (i.e., a tackiness rating of 10 based on the Facial Tissue Paper Test). Thus, at loadings of 0.1-0.5 phr, the tung oil was able to provide a completely tack-free surface, whereas the control Sample #1 with no tung oil was poorly cured and gave a very tacky surface. The results in TABLE 2 also show that tung oil appears to act as a crosslinking coagent at a loading of 0.3 phr and above, based on the increasing MH (dN-m) values. The RPA results indicate significant co-agent activity at >0.30 phr tung oil.

Example 2

In this example, various oils were combined 50:50 with trimethylolpropane trimethacrylate (SR-350 from Sartomer), and evaluated on their ability to provide a tack-free surface when crosslinking a blend of EPDM and a poly (ethylene α-olefin) copolymer in a hot air oven at 205° C. for 15 minutes. In this example, the following oils were tested: tung oil, linseed oil, canola oil, safflower oil, walnut oil, sunflower oil, perilla oil and poppy seed oil. All of these oils provided a tack-free surface when blended with an organic peroxide.

EPDM can contain from roughly 5% and up to 9% unsaturation, which can be crosslinked by sulfur vulcanization. However, sulfur vulcanization cure systems cannot cure saturated polyethylene copolymers like EVA or poly (ethylene-α-olefin) copolymers. TABLE 3 provides the generic formulation that was used to evaluate a 54% and 46% blend of an EPDM and poly(ethylene-α-olefin) copolymer.

TABLE 3

| "EPDM + EP Masterbatch" | |
|---|---|
| EPDM | 54 |
| Poly(ethylene α-olefin) | 46 |
| Carbon Black & Fillers | 240 |
| Process Oil | 89 |
| Total Ingredients | 429 |

TABLE 4A

THE EFFECT OF VARIOUS BIO-BASED OILS USED IN COMBINATION WITH TMPTMA

| | | Bio-Based Oil | | | | |
|---|---|---|---|---|---|---|
| | | Control | Tung | Linseed | Canola | Safflower |
| Vul-Cup® 40KE | phr | 6 | 6 | 6 | 6 | 6 |
| TMPTMA | phr | 3 | 3 | 3 | 3 | 3 |
| phr of Drying Oil | phr | 0 | 3 | 3 | 3 | 3 |
| RPA Rheometer Study at 182° C., 1 deg arc, 100 cpm | | | | | | |
| ML | dNm | 1.45 | 1.48 | 1.45 | 1.37 | 1.46 |
| MH | dNm | 18.09 | 23.23 | 18.10 | 17.40 | 17.22 |
| MH – ML | dNm | 16.63 | 21.75 | 16.64 | 16.03 | 15.76 |
| Ts1 | min | 0.51 | 0.44 | 0.54 | 0.51 | 0.53 |
| Ts2 | min | 0.71 | 0.58 | 0.74 | 0.72 | 0.74 |
| TC90 | min | 3.74 | 3.94 | 3.96 | 3.67 | 3.70 |
| RPA Stress Relaxation test at 183° C., 3 deg arc | | | | | | |
| % Drop@0.1 s | % | 15.8 | 13.4 | 17.4 | 17.7 | 17.4 |
| % Drop@1 s | % | 22.3 | 18.3 | 24.5 | 24.8 | 24.5 |
| % Drop@5 s | % | 25.6 | 21.0 | 27.8 | 28.2 | 27.9 |
| % Drop@10 s | % | 26.9 | 22.1 | 29.0 | 29.4 | 29.2 |
| Facial Tissue Tackiness Test 10 = non-tacky | 0 to 10 | 0 | 10 | 10 | 10 | 10 |

TABLE 4B

THE EFFECT OF VARIOUS BIO-BASED OILS USED IN COMBINATION WITH TMPTMA

| Bio-Based Oil | | Walnut | Sunflower | Perilla | Poppy |
|---|---|---|---|---|---|
| Vul-Cup® 40KE | phr | 6 | 6 | 6 | 6 |
| TMPTMA | phr | 3 | 3 | 3 | 3 |
| phr of Drying Oil | phr | 3 | 3 | 3 | 3 |
| RPA Rheometer Study at 182° C., 1 deg arc, 100 cpm | | | | | |
| ML | dNm | 1.59 | 1.42 | 1.71 | 1.56 |
| MH | dNm | 18.81 | 17.49 | 19.97 | 17.83 |
| MH – ML | dNm | 17.22 | 16.07 | 18.26 | 16.27 |
| Ts1 | min | 0.50 | 0.51 | 0.47 | 0.51 |
| Ts2 | min | 0.68 | 0.72 | 0.63 | 0.71 |
| TC90 | min | 3.86 | 3.73 | 3.75 | 3.84 |
| RPA Stress Relaxation test at 183° C., 3 deg arc | | | | | |
| % Drop@0.1 s | % | 17.8 | 17.5 | 17.7 | 17.4 |
| % Drop@1 s | % | 25.2 | 24.8 | 25.0 | 24.8 |
| % Drop@5 s | % | 28.7 | 28.2 | 28.3 | 28.3 |
| % Drop@10 s | % | 30.0 | 29.4 | 29.5 | 29.6 |
| Facial Tissue Tackiness Test 10 = non-tacky | 0 to 10 | 10 | 10 | 10 | 10 |

As shown in TABLES 4A and 4B, it was found that the bio-based oils provided a tack-free rubber surface when curing the blend of EPDM and poly(ethylene-α-olefin). It was also found that tung oil, walnut oil and perilla oil acted like crosslinking coagents. When using these three oils, a tack-free hot air cure was obtained, as well as a significantly higher state of cure based on the MH (dN-m) values, compared to the control using just TMPTMA.

In each case the TMPTMA coagent contained HQ (hydroquinone)+MEHQ (mono methyl ether hydroquinone). In the practice of the invention, the use of a free radical trap is beneficial especially when using the various drying oils. Additional use of various hydroquinones such as MTBHQ is recommended for long term (6 months) storage of the peroxide plus tung oil and blends of tung oil with crosslinking coagents like TMPTMA (trimethyloylpropane trimethacrylate) also known as Sartomer SR-350.

Example 3

In this example, hemp oil was used in combination with an organic peroxide (Vul-Cup® 40KE) to cure the EPDM formulation of TABLE 1, resulting in a tack-free rubber surface. Samples were cured for 15 minutes in a 205° C. hot air oven, and then subjected to the Facial Tissue Paper Test to assess tackiness. As shown in TABLE 5, loading of 3.0 phr hemp oil resulted in a tack-free surface.

TABLE 5

Use of Hemp Oil when curing EPDM with organic peroxides in a Hot Air Oven at 205° C., 15 min

| Sample # | 1 | 2 |
| --- | --- | --- |
| EPDM Masterbatch (from Table 1) parts | 244 | 244 |
| phr Vul-Cup ® 40KE | 6.0 phr | 6.0 phr |
| phr Hemp Oil | 3.0 phr | 6.0 phr |
| RPA Rheometer Cure at 185° C., 1° arc, 100 cpm (1.667 Hz) | | |
| ML (dN-m) | 1.31 | 1.15 |
| MH (dN-m) | 12.53 | 8.05 |
| MH – ML (dN-m) | 25.20 | 24.40 |
| Ts1 (min) | 0.48 | 0.57 |
| Tc90 (min) | 1.63 | 1.58 |
| Hot Air Oven Cure at 205° C., 15 minutes, then Surface Tack Testing with Facial Tissue | | |
| Surface Tack: 10 = non-tacky; 0 = very tacky | 10 | 7.5 |

Example 4

In this example, an EPDM MB (masterbatch) whose formulation is provided in TABLE 1 was compounded with a blend of an organic peroxide (Luperox® F90P), two sulfur compounds (Vultac® 5 and MBTS), and a 50:50 blend of 4-OHT and MTBHQ, combined with a bio-based oil (Tung Oil) as shown below in TABLE 6. Compounded EPDM samples were tested in a rheometer at 185° C. and cured in a hot air oven at 205° C. for 15 minutes.

TABLE 6

| Component | Parts or phr |
| --- | --- |
| Parts EPDM MB Table 1 | 244 parts |
| phr Luperox ® F90P | 3.85 phr |

TABLE 6-continued

| Component | Parts or phr |
| --- | --- |
| phr Vultac ® 5 | 1.54 phr |
| phr MBTS | 0.38 phr |
| phr 4-OHT | 0.36 phr |
| phr MTBHQ | 0.36 phr |
| phr Tung Oil (a bio-based oil) | 1.20 phr |
| RPA Rheometer Cure at 185° C., 1° arc, 100 cpm (1.667 Hz) 15 minutes | |
| ML (dN-m) | 1.29 |
| MH (dN-m) | 19.26 |
| MH - ML (dN-m) | 17.97 |
| Ts1 scorch time (min.) | 0.56 |
| Ts2 scorch time (min.) | 0.71 |
| Tc50 (minutes) | 1.55 |
| Tc90 (minutes) | 3.53 |
| Hot air oven curing at 205° C. for 15 min, then the facial tissue testing. | |
| Surface Tack: 10 = non-tacky; 0 = very tacky | 10 |

Unexpectedly, this peroxide composition in Table 6 provided a tack-free (10 rating) cured rubber surface, based on our facial tissue surface tack test.

Example 5

As shown in Table 7, a blend of Tung Oil, MTBHQ and Di-Cup® 40C as per the teachings of our invention was evaluated (Run #2) for the crosslinking of Vamac® DP which is a poly(ethylene acrylate) copolymer sometimes abbreviated as AEM or ACM for a polyacrylate rubber [Table 7]. This was compared to a conventional, control peroxide cure (Run #1) that used Di-Cup® 40C and a triallyl isocyanurate coagent. The third run (Run #3) used a blend of Tung Oil, MTBHQ, Di-Cup® 40C, Vultac® 5, and MBTS as per the teachings of the invention, to cure a Vamac® DP based elastomer composition.

TABLE 7

| Run # | 1 control | 2 | 3 |
| --- | --- | --- | --- |
| DuPont VAMAC ® DP | 100.00 | 100.00 | 100.00 |
| N550 carbon black | 87.00 | 87.00 | 87.00 |
| Chemtura Naugard ® 445 | 1.00 | 1.00 | 1.00 |
| Stearic Acid | 0.50 | 0.50 | 0.50 |
| R. T. Vanderbilt Vanfre ® VAM | 0.50 | 0.50 | 0.50 |
| Arkema Di-Cup ® 40C | 6.00 | 6.00 | 4.90 |
| Arkema MLPC, Vultac ® 5 | 0.00 | 0.00 | 0.08 |
| R. T. Vanderbilt Altax ® (MBTS) | 0.00 | 0.00 | 0.02 |
| 72% TAIC on silica | 2.00 | 0.00 | 0.00 |
| Tung Oil | 0.00 | 2.00 | 4.00 |
| mono-t-butyl hydroquinone (MTBHQ) | 0.00 | 0.06 | 0.12 |
| RPA 173 C., 1° arc, 100 cpm: MH (dN-m) | 17.90 | 22.60 | 32.00 |
| Hot Air Oven Cure at 200° C. for 15 minutes, followed by the Tackiness Test | | | |
| Surface Tack: 10 = non-tacky; 0 = very tacky | 0 | 8 | 9 |

We found that the two compositions (Run #2 and Run #3) in Table 7 provided excellent hot air cured surfaces (ratings of 8 & 9) versus the hot air cure performance of the conventional (standard peroxide control; Run #1) which had a rating of 0, as the rubber surface was completely covered by tissue paper.

These novel formulations shown in Run #2 and Run #3 are useful for operations that currently use steam autoclave to help reduce part scrap. In addition, these formulations also provide the ability to conduct hot air tunnel curing. Although Vamac® DP is a sticky compound, when cured using technology of this invention and cooled the samples made as per Runs #2 and #3 had a tack free surfaces versus the standard peroxide control formulation.

Example 6

In Table 8, for Example 6, two successful peroxide formulations based on the practice of this invention are presented which provided excellent (10) to very good (8 out of 10) hot air oven surface cure performance at 200° C. for 15 minutes. Under these conditions all conventional peroxide formulations provide very tacky surfaces (0 Rating).

TABLE 8

| Run # | 1 | 2 |
|---|---|---|
| ExxonMobil Vistalon ® 2504 EPDM | 100.00 | 100.00 |
| N550 Carbon Black | 270.00 | 270.00 |
| Sunpar ® 2280 process oil | 160.00 | 160.00 |
| Stanguard ® TMQ powder antioxidant | 2.00 | 2.00 |
| Arkema Luperox ® 101 | 6.77 | 9.00 |
| Vanax ® MBM coagent | 0.70 | 0.00 |
| Tung Oil | 5.02 | 4.00 |
| Arkema MLPC Vultac ® 5 | 0.82 | 0.00 |
| R. T. Vanderbilt Altax ® (MBTS) | 0.70 | 0.00 |
| mono-t-butyl hydroquinone (MTBHQ) | 0.05 | 0.04 |
| RPA, 200° C., 1° arc, 100 cpm: MH (dN-m) | 5.93 | 10.82 |
| Hot air oven curing @205° C. for 15 minutes followed by the tack test | | |
| Surface Tack: 10 = non-tacky; 0 = very tacky | 10 | 8 |

The use of Luperox® 101 used in combination with Tung oil and MTBHQ free radical trap (Run #2) provided a very good hot air cured surface with an 8 rating. An excellent air cured surface with a perfect 10 rating was obtained with Luperox® 101, Tung oil, MTBHQ free radical trap, Vultac® 5+MBTS sulfur containing compounds and N,N'phenylene bismaleimide (HVA-2) coagent when cured at 205° C. in the hot air oven. The use of Luperox® 101 peroxide is also preferred as it provides low odor along with no surface bloom that is sometimes required for industrial and/or automotive gaskets and hose.

Example 7

Crosslinking EVA elastomer in a hot air oven at 205° C.

TABLE 9

| Component | phr |
|---|---|
| EVA | 100.00 |
| Calcium Carbonate | 20.00 |
| MgO | 2.00 |
| Silica | 2.23 |
| Di-Cup ® R | 1.49 |
| Tung Oil | 1.24 |
| MTBHQ | 0.04 |
| RPA 185° C., 1° arc, 100 cpm: MH (dN-m) | 5.9 |
| 205° C. Hot Air oven cure for 15 minutes | |
| Surface Tack: 10 = non-tacky; 0 = very tacky | 7 |

Example 7, TABLE 9 demonstrates successful crosslinking of an EVA elastomer with a novel blend (consistent with this invention) of dicumyl peroxide, Tung Oil and MTBHQ (mono-tertiary-butyl hydroquinone) in a hot air oven at 205° C. for 15 minutes, resulting in a relatively tack-free surface (rating 7 out of 10).

We claim:
1. An organic peroxide formulation for curing a solid elastomer composition in the full or partial presence of oxygen consisting essentially of:
A) at least one organic peroxide which undergoes decomposition by heat to generate radicals, selected from the group consisting of 2,5-di(t-butylperoxy)-2,5-dimethyl hexane; t-butyl cumyl peroxide; 2,5-dimethyl-2,5-di(t-butylperoxy)hexane-3; t-butylperoxy-isopropenylcumylperoxide; 3,3,5,7,7-pentamethyl-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy) cyclohexane; n-butyl 4,4-di(t-butylperoxy)valerate; ethyl 3,3-di(t-butylperoxy)butyrate; OO-t-butyl)-O-(2-ethyl hexyl)monoperoxy carbonate; OO-t-butyl-O-isopropylmonoperoxy carbonate; polyether poly-t-butylperoxy carbonate; t-butyl-2-ethylhexylmonoperoxycarbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate,
B) at least one drying oil, and
C) at least one free radical trap selected from the group consisting of nitroxides and quinones,
wherein the amounts of the at least one organic peroxide, the at least one drying oil and the at least one free radical trap are selected such that the formulation cures the solid elastomer composition in the full or partial presence of oxygen, wherein at least one drying oil is selected from the group consisting of: Lung oil, hemp oil, linseed oil, poppy oil, walnut oil, sunflower oil, cottonseed oil, corn oil, soybean oil, sardine oil, herring oil, safflower oil, flax seed oil, perilla oil, and a combination thereof.
2. The formulation of claim 1, wherein the at least one free radical trap is selected from the group consisting of 4-hydroxy TEMPO and mono-tert-butyl hydroquinone (MTBHQ).
3. The formulation of claim 1, wherein the at least one drying oil is tung oil and the at least one free radical trap is MTBHQ.
4. An elastomer composition which cures in the full or partial presence of oxygen comprising:
A) at least one solid elastomer selected from the group consisting of ethylene-propylene-diene terpolymer (EPDM), fluoroelastomers (FKM, FFKM, FVMQ), vinyl silicone rubber (VMQ), nitrile rubber (NBR), acrylonitrile-butadiene-styrene (ABS), styrene-butadiene rubber (SBR), styrene-butadiene-styrene block copolymers (SBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloroprene, bromobutyl rubber (BHR), chlorobutyl rubber, and combinations thereof,
B) at least one organic peroxide which undergoes decomposition by heat to generate radicals selected from the group consisting of 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcum- ylperoxide; 3,3,5,7,7-pentamethyl-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butyl-2-ethylhexylmonoperoxycarbonate; t-butylperoxybenzoate; t-butylperoxyacetate; t-butylperoxymaleic acid; di(4-methylbenzoyl)peroxide; dibenzoyl peroxide; di(2,4-dichlorobenzyl)peroxide; dilauroyl peroxide; cumene hydroperoxide; and di(4-tert-butylcyclohexyl)peroxydicarbonate,
C) at least one drying oil selected from the group consisting of: tung oil, hemp oil, linseed oil, poppy oil, walnut oil, sunflower oil, cottonseed oil, corn oil, soybean oil, sardine oil, herring oil, safflower oil, flax seed oil, perilla oil, and a combination thereof, and
D) at least one free radical trap selected from the group consisting of nitroxides and quinones,
wherein the elastomer composition is solid is not a liquid coating, and cures in the full or partial presence of oxygen.

5. The elastomer composition of claim 4 further comprising at least one polymer, wherein the polymer is selected from the group consisting of: ethylene-propylene copolymer (EPM), poly(ethylene α-olefins), poly(ethylene-octene), poly(ethylene-hexene), poly(ethylene-butylene), poly(ethylene-heptene), poly(ethylene-butene), poly(ethylene) (PE), high-density polyethylene (HDPE), linear low-density polyethylene (LLDPE), low-density polyethylene (LDPE), poly(ethylene-vinyl acetate) (EVA), poly(ethylene acrylate) elastomer, polysulfide rubber, chlorinated poly(ethylene) (CM or CPE), polyurethane (AU, EU), vinylidene fluoride copolymers (CFM), silicone rubber (PMQ), poly(ethylene methylacrylate) (ACM), chlorosulfonated poly(ethylene) (CSM), fluorosilicone rubber (FVMQ), fluoelastomer (FKM), and a combination thereof.

6. The elastomer composition of claim 4, wherein the at least one free radical trap is selected from the group consisting of 4-hydroxy-TEMPO and MTBHQ.

7. A process for curing the solid elastomer composition of claim 4, the process comprising:
curing the solid elastomer composition in the presence of oxygen
wherein the elastomer composition comprises at least one solid elastomer, at least one organic peroxide, at least one drying oil, and at least one free radical trap.

8. A cured solid elastomer composition prepared by the process of claim 7 which is not a liquid coating.

9. An organic peroxide formulation for curing a solid elastomer composition in the full or partial presence of oxygen comprising:
A) at least one organic peroxide which undergoes decomposition by heat to generate radicals selected from the group consisting of 2,5-di(t-butylperoxy)-2,5-dimethyl hexane; t-butyl cumyl peroxide; 2,5-dimethyl-2,5-di(t-butylperoxy)hexane-3; t-butylperoxy-isopropenylcumylperoxide; 3,3,5,7,7-pentamethyl-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butyl-2-ethylhexylmonoperoxycarbonate; t-butylperoxybenzoate; t-butylperoxyacetate; t-butylperoxymaleic acid; di(4-methylbenzoyl)peroxide; dibenzoyl peroxide; di(2,4-dichlorobenzoyl)peroxide; dilauroyl peroxide; cumene hydroperoxide; and di(4-tert-butylcyclohexyl)peroxydicarbonate,
B) at least one drying oil selected from the group consisting of: tung; oil, hemp oil, linseed oil, poppy oil, walnut oil, sunflower oil, cottonseed oil, corn oil, soybean oil, sardine oil, herring oil, safflower oil, flax seed oil, perilla oil, and a combination thereof, and
C) at least one crosslinking coagent,
D) at least one free radical trap selected from the group consisting of nitroxides and quinones,
wherein the amounts of the at least one organic peroxide, the at least one drying oil and the at least one free radical trap are selected such that the formulation cures the solid elastomer composition in the full or partial presence of oxygen.

10. The organic peroxide formulation of claim 9, wherein the crosslinking coagent has functionality is selected from the following group: dimethacrylates, trimethyacrlyates, polymethacrylates, methacrylates, diacrylates, triacrylates, polyacrylates, acrylates, allylic, maleimide, metallic coagents, zinc dimethacrylate and zinc diacrylate.

11. An organic peroxide formulation for curing a solid elastomer composition in the full or partial presence of oxygen comprising:
A) at least one organic peroxide which undergoes decomposition by heat to generate radicals, selected from the group consisting of 2,5-di(t-butylperoxy)-2,5-dimethyl hexane; t-butyl cumyl peroxide; 2,5-dimethyl-2,5-di(t-butylperoxy)hexyne-3; t-butylperoxy-isopropenylcumylperoxide; 3,3,5,7,7-pentamethyl-1,2,4-trioxepane; 3,6,9, triethyl-3,6,9-trimethyl-1,4,7-triperoxynonane; m/p-di(t-butylperoxy)diisopropyl benzene; m-di(t-butylperoxy)diisopropyl benzene; p-di(t-butylperoxy)diisopropyl benzene; di-t-butyl peroxide; di-t-amyl peroxide; dicumyl peroxide; 1,1-di(t-butylperoxy)-3,3,5-trimethylcyclohexane; 1,1-di(t-butylperoxy)cyclohexane; n-butyl 4,4-di(t-butylperoxy)valerate; ethyl 3,3-di(t-butylperoxy)butyrate; OO-t-butyl-O-(2-ethyl hexyl)monoperoxy carbonate; OO-t-butyl-O-isopropylmonoperoxy carbonate; polyether poly-t-butylperoxy carbonate; t-butyl-2-ethylhexylmonoperoxycarbonate; t-butylperoxybenzoate; t-butylperoxyacetate; t-dichlorobenzoyl)peroxide; dilauroyl peroxide; cumene hydroperoxide; and di(4-tert-butylcyclohexyl)peroxydicarbonate,
B) at least one drying oil selected from the group consisting of: tung oil, hemp oil, linseed oil, poppy oil, walnut oil, sunflower oil, cottonseed oil, corn oil, soybean oil, sardine oil, herring oil, safflower oil, flax seed oil, perilla oil, and a combination thereof, and
C) at least one sulfur containing compound which crosslinks polymers,
D) at least one free radical trap selected from the group consisting of nitroxides and quinones, and E) optionally, inert filler, wherein the amounts of the at least one organic peroxide, the at least one drying oil and the at least one free radical trap are selected such that the formulation cures the solid elastomer composition in the full or partial presence of oxygen.

12. A composition for curing a solid elastomer composition in the full or partial presence of oxygen comprising tung oil, MTBHQ, N,N'-phenylene-bismaleimide, and at least one peroxide selected from the group consisting of 1,1-di(t-butylperoxy)-3,3,5-trimethyl cyclohexane, t-butylperoxybenzoate, t-butylperoxy-2-ethylhexylmonoperoxycarbonate, dicumyl peroxide, m/p-di(t-butylperoxy)diisopropylbenzene, 2,5-dimethyl-2,5-di(t-butylperoxy)hexane, and t-butylcumylperoxide, and optionally, inert filler, wherein the amounts of the tung oil, at least one organic peroxide, MTBHQ, and N,N'-phenylene-bismaleimide are selected such that the formulation cures the solid elastomer composition in the presence of oxygen.

* * * * *